Figure 1:
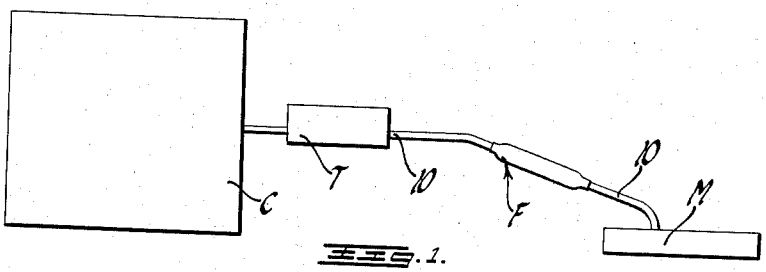

Jan. 13, 1959 R. M. YOUNG 2,868,323
FILTERING DEVICE
Filed Aug. 1, 1956

INVENTOR
Roger M. Young
BY R. P. Barnard
ATTORNEY

United States Patent Office 2,868,323
Patented Jan. 13, 1959

2,868,323

FILTERING DEVICE

Roger M. Young, Rochester, N. Y., assignor to General Motors Corporation, Detroit, Mich., a corporation of Delaware Application August 1, 1956, Serial No. 601,418

2 Claims. (Cl. 183—75)

The present device relates to a unique air filtering device and more particularly one in which the filter may be cleaned without the removal of parts.

While the present filtering device has more general application, it has been specifically designed for use with automatic chokes in which there is a problem of maintaining the air drawn through the thermostat mechanism in a relatively clean condition. Unless such a filter is provided, it is found over a period of time that the thermostate eventually becomes fouled with impurities to an extent requiring the mechanism to be overhauled. Although it is not broadly new to provide a filter in the general environment illustrated, there has long been a need to provide a filter which may be easily cleaned without necessitating the time consuming and frequently inconvenient disassembly of the automatic choke mechanism. The present filtering device has been developed in order to solve this very practical problem and will hereinafter be described in detail.

Figure 2:
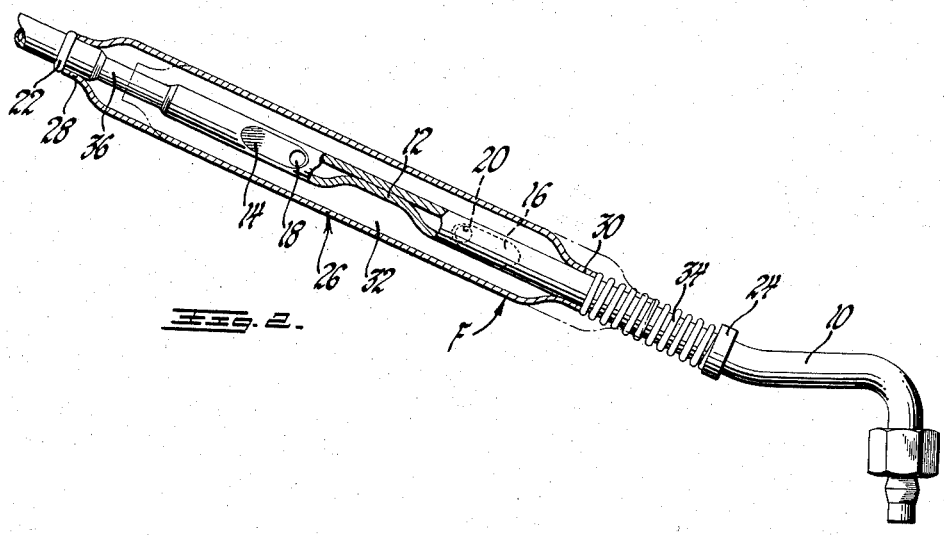
Figure 3:
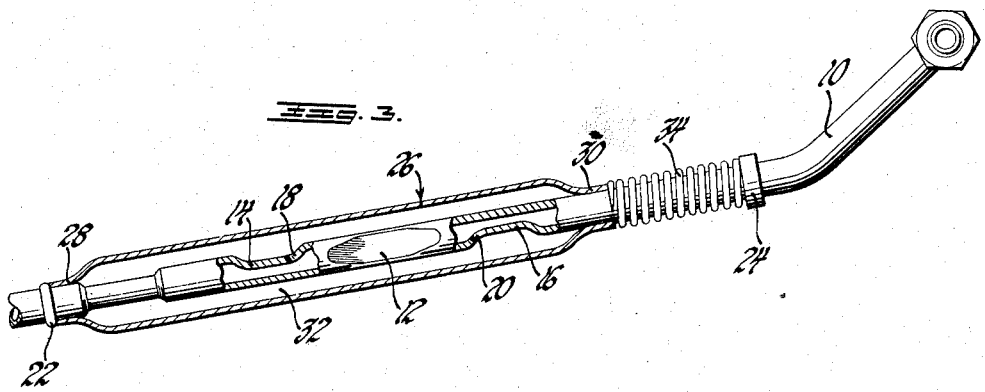

In the drawing:

Figure 1 is a schematic representation of the subject invention in the environment of a carburetion system; and Figures 2 and 3 are partially sectioned views showing details of the subject invention.

Referring to the diagrammatic representation of Figure 1, a carburetor is shown generally at C, a thermostat at T, an exhaust manifold at M and the filtering device at F.

In Figure 2 it will be seen that the filtering device F includes an air tube 10 which is crimped or otherwise blocked at 12 to prevent the continuous flow of air therethrough. Tube 10 has radial depressions 14 and 16 formed therein in axially spaced relation to the crimped portion 12. Holes or orifices 18 and 20 are formed in the radial depressions 14 and 16. It is to be noted that the holes 18 and 20 open in opposite directions to insure the most effective filtering action.

A pair of axially spaced shoulders 22 and 24 are formed or otherwise fixed on tube 10. A sleeve 26 is mounted on tube 10 and includes a pair of necked down or reduced end portions 28 and 30 which slidably support the sleeve. The reduced portions 28 and 30 in conjunction with the remainder of sleeve 26 cooperate with tube 10, in the position shown in Figures 2 and 3, to provide a closed annular chamber 32.

In order to maintain the sleeve in the position shown in the drawing, in which chamber 32 is closed, a spring 34 surrounds tube 10 and is mounted intermediate portion 30 of sleeve 26 and shoulder 24 thereby biasing the reduced portion 28 of sleeve 26 against shoulder 22.

Insofar as the device has been described, it may be seen that air from the manifold M will be drawn through tube 10 by carburetor C. In so moving, the air, due to restriction 12, will leave the tube through opening 20, flow into chamber 32, and due to the latter's closed nature, assume a tortuous path around the tube to re-enter the latter through opening 18 and resume its flow toward the thermostat T. It will be observed that any impurities or particles suspended or otherwise carried by the air in flowing through tube 10 will follow the air stream into the chamber 32 and due to their relatively greater mass and hence inertia, as compared with the air stream, be deposited in the chamber as the air changes direction of flow. Thus the air flowing through the thermostat T will be clean and not subject the mechanism to fouling.

It is apparent, of course, that over a period of time the chamber 32 will become filled with the impurities deposited by air flowing therethrough, as described above. To provide means whereby the filter may be simply and expeditiously cleaned, the filter F is constructed to permit the chamber 32 to be opened. To this end, a portion of tube 10 proximate the reduced portion 28 of sleeve 26 has been radially relieved to provide a section 36 of the tube which is diametrically smaller than the adjacent tube sections.

Thus, when it is desired to clean out the chamber 32, sleeve 26 is moved axially against the force of spring 34 causing the reduced portion 28 of the sleeve to override the reduced portion 36 of tube 10, as shown in the dotted lines in Figure 2. In this way the left end chamber 32 is opened and the impurities therewithin may be shaken out by gravity or, if the disposition of the filter is not such to facilitate shaking out, an air hose may be utilized to blow the impurities out of the chamber. After the impurities have thus been removed from chamber 32 the sleeve 26 is simply released and will return under the influence of spring 34 to once again close the chamber and condition the device for filtering operation.

While not shown, it would be possible to further facilitate the expurgation of chamber 32 by providing an additionally relieved portion on tube 10 like section 36 but disposed adjacent portion 30 of sleeve 26 exteriorly of chamber 32. In this way both ends of chamber 32 could be opened when sleeve 26 is shifted to the right against spring 34 making easier the removal of impurities from the chamber.

I claim:

1. A filter comprising an air tube, said air tube having first and second axially spaced shoulders thereon, a sleeve mounted upon said tube and axially slidable between said shoulders, the end portions only of said sleeve contacting said tube in a sliding relationship to define a closed filter chamber between said sleeve and said tube, a spring member disposed between a first end of said sleeve and said first shoulder to bias the second end of said sleeve into engagement with said second shoulder, means in the air tube between the axially disposed shoulders obstructing the flow of air through said tube, said means including a portion of said tube depressed to contact a diametrically opposed portion of said tube, a first flat surface on said tube between said means and said first shoulder and having an aperture therein, a second flat surface on said tube between said means and said second shoulder and having an aperture therein whereby the air entering said tube exits through one of said apertures and re-enters the air tube through the other of said apertures allowing dirt particles to collect in the filter chamber, and a reduced portion formed in said air tube between said second flat surface and said second shoulder, said sleeve and said tube forming said closed filter chamber when said second end of said sleeve is in contact with said second shoulder, and said sleeve and said reduced portion providing an outlet for said chamber to permit cleaning thereof when said second end of said sleeve overlies said reduced portion of the air tube.

2. A filter comprising an air tube, first and second shoulders axially disposed on said air tube, means disposed in said air tube between said shoulders to obstruct air flow therein, said means including a portion of said tube depressed to contact a diametrically opposed portion of said tube, a first flat surface upon said tube between said means and said first shoulder and having an aperture therein, a second flat surface on said tube between said means and said second shoulder and having an aperture therein, a reduced portion formed in said tube between said second flat surface and said second shoulder, a sleeve substantially coextensive with said tube between said shoulders and axially slidable therebetween, the end portions only of said sleeve contacting said tube in a sliding relationship to define a closed filter chamber between said sleeve and said tube, a spring disposed between a first end of said sleeve and said first shoulder to bias the second end of said sleeve into contact with said second shoulder, and said sleeve being movable against said spring at least a distance sufficient to permit said second end to overlie said reduced portion.

References Cited in the file of this patent

UNITED STATES PATENTS

| | | |
|---|---|---|
| 805,237 | Sears | Nov. 21, 1905 |
| 2,377,595 | Wiles | June 5, 1945 |
| 2,607,067 | Minerly | Aug. 19, 1952 |
| 2,715,520 | Boyce | Aug. 16, 1955 |